UNITED STATES PATENT OFFICE.

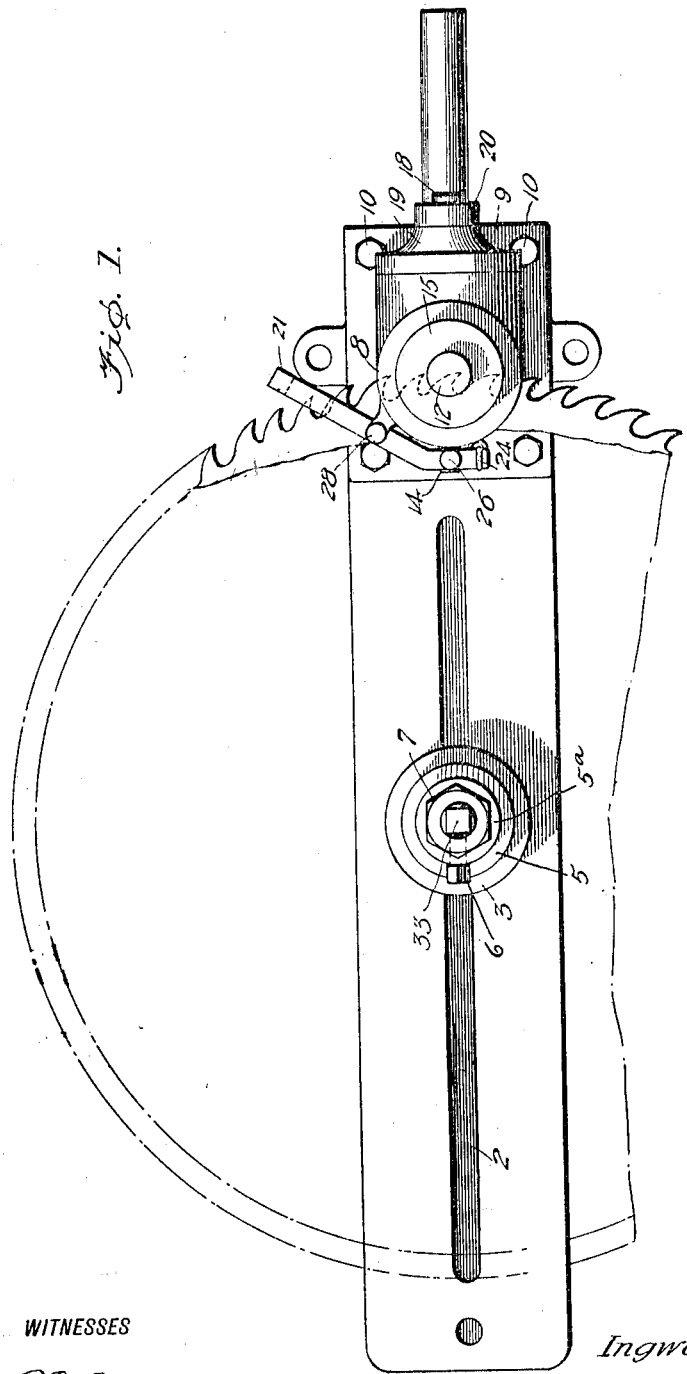
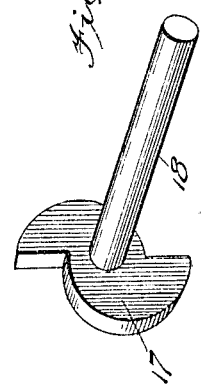

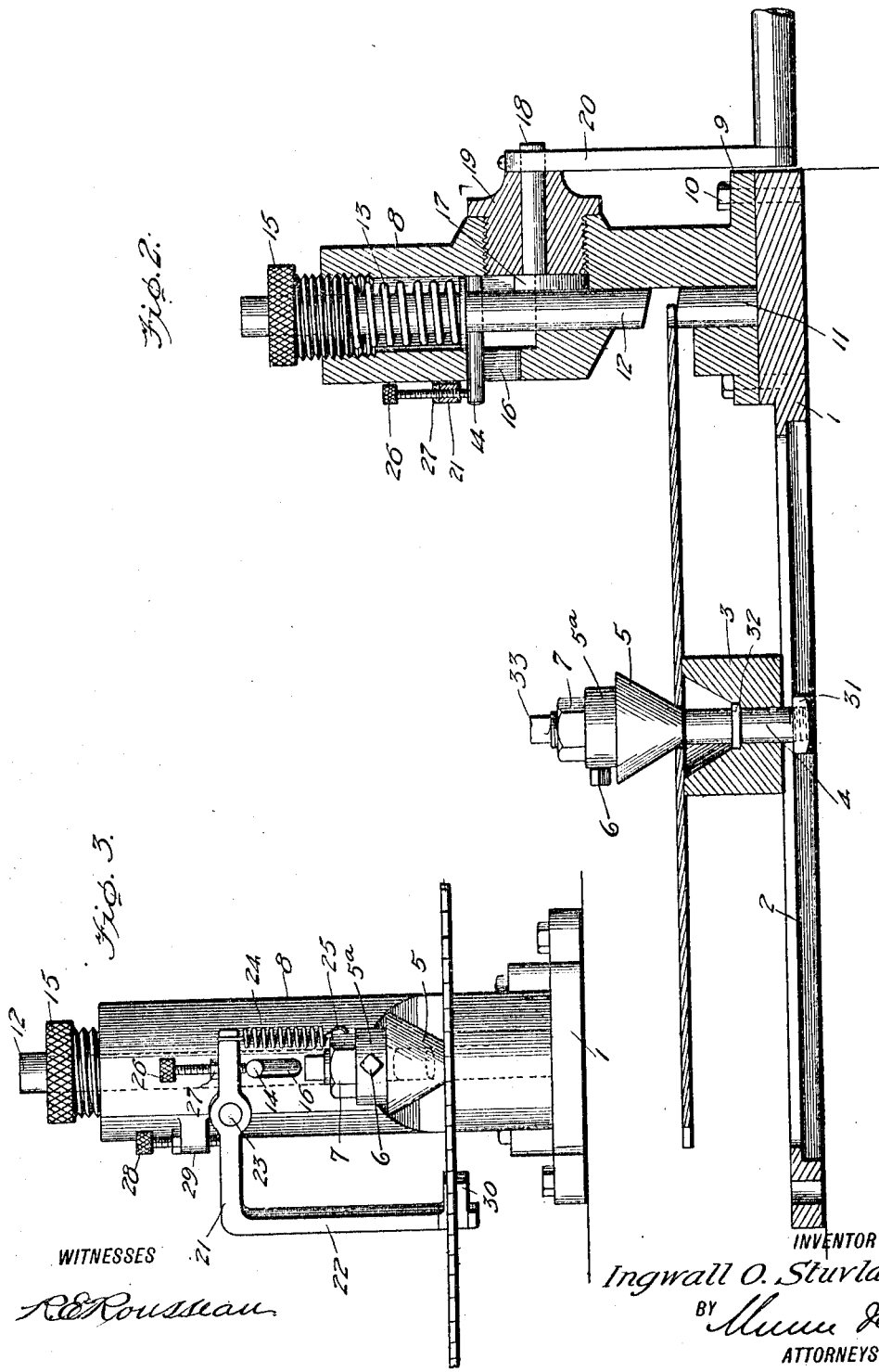

INGWALL O. STUVLAND, OF EVERETT, WASHINGTON.

SAW-SET.

1,274,468.   Specification of Letters Patent.   Patented Aug. 6, 1918.

Application filed April 4, 1918.  Serial No. 226,715.

*To all whom it may concern:*

Be it known that I, INGWALL O. STUVLAND, a citizen of the United States, and a resident of Everett, in the county of Snohomish and State of Washington, have invented certain new and useful Improvements in Saw-Sets, of which the following is a specification.

My invention is an improvement in saw sets, and has for its object to provide a device of the character specified especially adapted for setting saws of the circular type, wherein a support is provided for the saw upon which it may be rotated, and means in connection with the support for setting the teeth at the proper angle as they are brought into position at the said means, other means being provided, controlled by the setting of the teeth, for advancing the saw.

In the drawings:

Figure 1 is a top plan view of the improved saw set;

Fig. 2 is a vertical section;

Fig. 3 is a view looking from the saw support;

Fig. 4 is a perspective view of the cam shaft.

In the present embodiment of the invention, a suitable base 1 is provided, and the said base has a longitudinally extending slot 2. A saw support is mounted to move on the base at the slot, the said support comprising a ring or collar 3 through which is passed a bolt 4, the head of the bolt engaging in the slot, the sides of the slot being rabbeted at the under face of the support for receiving the bolt.

A conical collar 5 is adapted to pass over the bolt and to engage within the central opening of the saw, the said saw resting upon the upper edge of the ring 3, and it will be noticed that the bore of the ring is conical to fit the conical portion of the collar. The collar also has a cylindrical portion 5ᵃ, and through this portion is passed a set screw 6 for holding the collar in adjusted position. A nut 7 engages the bolt above the collar, and it will be noticed that the upper end of the bolt is squared.

At one end of the base is arranged a standard 8, the said standard having lugs 9 which are connected to the base by machine bolts 10, and this standard has a cut away portion at the side adjacent to the saw, through which the teeth of the saw may pass. At this cut away portion is arranged an anvil 11, the upper face of the anvil being of the proper inclination to impart the proper set to the teeth of the saw when they are struck upon the anvil by the hammer 12, which is mounted to move in the standard toward and from the anvil.

The hammer is normally pressed toward the anvil by a spring 13 which is arranged within the standard, between a cross pin 14 extending diametrically of the hammer and a nut 15 which is threaded into the upper end of the standard, the nut encircling the hammer. The pin 14 serves as a guide for preventing rotation of the hammer, which is a cylindrical body, during its vertical movement, the said pin engaging a vertical slot 16 in the standard at the face of the standard adjacent to the saw, and extending through the said slot as shown in Fig. 2.

It will be noticed that the lower end of the hammer is beveled or inclined to correspond with the bevel or inclination of the upper end of the anvil, and the hammer is lifted by means of a cam 17 on a shaft 18 which is journaled in a nut 19 held in a threaded nipple in the standard at the opposite side from the cut away portion and from the slot 16. A crank 20 is secured to the outer end of the shaft, for convenience in rotating the same, and it will be noticed that the cam has two cam portions, so that the hammer will be lifted twice for each complete rotation of the cam shaft.

Means is also provided for advancing the saw, the said means comprising an angle bar consisting of arms 21 and 22 extending at approximately a right angle with respect to each other, and the arm 21 is pivoted to the standard above and at one side of the slot 16, and at the face adjacent to the saw support, as indicated at 23, in such position that the free end of the arm 21 will be above the extended end of the pin 14.

A coil spring 24 is arranged between the free end of the arm and a pin 25 on the standard, and this spring normally acts to hold the angle bar in the position of Fig. 3, that is, with one portion vertical and one horizontal. A set screw 26 is threaded through an arm 21 of the angle bar, at the pin, for engaging the pin, and the set screw has a lock nut 27 for holding it in adjusted position. A second set screw 28 is threaded through a nut 29 on the standard at the opposite side of the pivotal connection 23 from the set screw 26, and this set screw engages the arm at the opposite side of the pivotal connection from the engagement with the pin 14. The arm 22 is provided at its lower end with a laterally extending finger 30 which engages the teeth of the saw in succession to advance the saw, when the angle bar is swung through the upward movement of the hammer.

The operation of the device is as follows:

The saw support is adjusted to such position, depending upon the diameter of the saw, that the teeth will rest upon the upper end of the anvil, and the support is secured in this position by means of the nut 7. The saw is rotatable on the support, and when the crank is turned the alternate teeth will be brought in succession between the hammer and the anvil by means of the angle bar 21—22. As the shaft 18 is rotated, the hammer will be lifted twice for each complete rotation, the cam engaging the pin 14, and whenever the pin is released from the cam the hammer will be forced quickly downward by the spring 13.

Referring to Fig. 4 it will be noticed that each cam portion has one face radial to the cam, the said face being at the high end of the cam, and whenever the pin moves off the high portion of the cam the hammer will be driven abruptly toward the anvil. As the hammer moves upwardly under the influence of the cam, the angle bar 21—22 is rocked to cause the jaw to be advanced the distance of two teeth. A continuation of the movement will set all of the teeth at the proper angle.

It will be understood that the alternate teeth are set, after which the saw is reversed on the support, and the intermediate teeth are set. Each time a tooth is set, the saw is moved a distance of two teeth, to bring the next alternate tooth between the hammer and the anvil.

Referring to Fig. 2 it will be noticed that the head 31 of the bolt 4 has threaded engagement with the bolt. The bolt also has an annular stop or collar 32 at the bottom of the conical recess in the ring 3, and the bolt also has a polygonal portion 33 at its upper end by means of which it may be turned to tighten and make rigid the connection between the collar 3 and the base 1. It will be understood that the crank 20 might be replaced by a pulley in order that the device might be operated by power.

I claim:

A device of the character specified, comprising a base, a standard at one end of the base, an anvil supported by the standard, a hammer mounted in the standard to move toward and from the anvil, a spring normally pressing the hammer toward the anvil, means for varying the tension of the spring, a cam for moving the hammer away from the anvil against the tension of the spring, a saw support for rotatably mounting a saw on the base and adjustable toward and from the standard, means on the standard for engaging the teeth of the saw to advance the same, and a connection between the said means and the anvil for advancing the saw whenever the hammer is lifted, said advancing means comprising an elbow lever having one arm pivoted to the standard and having the other provided with a pawl for engaging the teeth, a pin on the hammer for engaging the pivoted arm of the elbow lever, and set screws for limiting the movement of the elbow lever, one of the set screws engaging the pin.

INGWALL O. STUVLAND.

Witnesses:
 M. G. MASON,
 N. O. McWATZ.

Copies of this patent may be obtained for five cents each, by addressing the "Commissioner of Patents, Washington, D. C."